(12) United States Patent
Neumetzler et al.

(10) Patent No.: US 8,262,404 B2
(45) Date of Patent: Sep. 11, 2012

(54) TERMINAL BLOCK AND CONTACT ELEMENT FOR TELECOMMUNICATIONS AND DATA SYSTEMS

(75) Inventors: Heiko Neumetzler, Berlin (DE); Harald Klein, Berlin (DE)

(73) Assignee: ADC GmbH, Berlin (DE)

( * ) Notice: Subject to any disclaimer, the term of this patent is extended or adjusted under 35 U.S.C. 154(b) by 118 days.

(21) Appl. No.: 12/663,237

(22) PCT Filed: May 16, 2008

(86) PCT No.: PCT/EP2008/003951
§ 371 (c)(1),
(2), (4) Date: Dec. 4, 2009

(87) PCT Pub. No.: WO2008/148458
PCT Pub. Date: Dec. 11, 2008

(65) Prior Publication Data
US 2010/0173516 A1    Jul. 8, 2010

(30) Foreign Application Priority Data
Jun. 5, 2007  (DE) .......................... 10 2007 026 111

(51) Int. Cl.
*H01R 4/26* (2006.01)
(52) U.S. Cl. ........................................ 439/404; 439/709
(58) Field of Classification Search .................. 439/402, 439/404, 405, 709–712, 723–724, 912, 922, 439/942
See application file for complete search history.

(56) References Cited

U.S. PATENT DOCUMENTS

| | | | |
|---|---|---|---|
| 3,588,785 A | 6/1971 | Hardardt et al. |
| 4,171,857 A | 10/1979 | Forberg et al. |
| 4,647,121 A | 3/1987 | Dolansky et al. |
| 4,790,770 A | 12/1988 | Klaiber |
| 5,722,850 A | 3/1998 | White |
| 6,068,503 A | 5/2000 | Gerke et al. |
| 6,302,723 B1 | 10/2001 | Baum et al. |
| 7,037,118 B2 | 5/2006 | Neumetzler et al. |
| 2006/0160404 A1 | 7/2006 | Alarcon et al. |
| 2008/0305684 A1 | 12/2008 | Neumetzler et al. |
| 2009/0011633 A1 | 1/2009 | Busse et al. |
| 2009/0130890 A1 | 5/2009 | Neumetzler |

FOREIGN PATENT DOCUMENTS

| | | |
|---|---|---|
| DE | 33 11 459 | 10/1984 |
| DE | 34 12 468 | 10/1985 |
| DE | 36 14 592 | 7/1987 |
| DE | G 94 02 468.5 | 3/1995 |
| DE | 196 52 422 | 4/1998 |
| DE | 102 36 114 | 10/2003 |
| DE | 102 57 308 | 7/2004 |
| DE | 103 41 694 | 2/2005 |

(Continued)

*Primary Examiner* — Khiem Nguyen
(74) *Attorney, Agent, or Firm* — Merchant & Gould P.C.

(57) ABSTRACT

The invention relates to a terminal block (1) for telecommunications and data systems, comprising a housing, in which first and second contacts (10, 12) for connecting leads are arranged, the first contacts (10) being accessible from the upper side (13) of the housing and the second contacts (12) being accessible from the lower side (14) of the housing, each first and second contact forming a contact pair. Each of said contact pairs has at least one interface, which is accessible from the exterior and is used to connect plugs or magazines, said interface being designed as a bifurcated contact (15) and the first contact (10), second contact (12) and the bifurcated contact (15) forming a one-piece contact element (18). The invention also relates to an associated contact element (18).

15 Claims, 3 Drawing Sheets

A - A

FOREIGN PATENT DOCUMENTS

| | | |
|---|---|---|
| DE | 10 2004 017 605 | 10/2005 |
| DE | 10 2004 054 535 | 3/2006 |
| DE | 10 2004 061 681 | 7/2006 |
| DE | 10 2007 006 693 | 8/2008 |
| EP | 0 667 650 | 8/1995 |
| EP | 0 743 710 | 11/1996 |
| GB | 2 129 628 | 5/1984 |
| NL | 7805902 | 12/1978 |
| WO | WO 2005/101587 | 10/2005 |
| WO | WO 2008-098607 | 8/2008 |

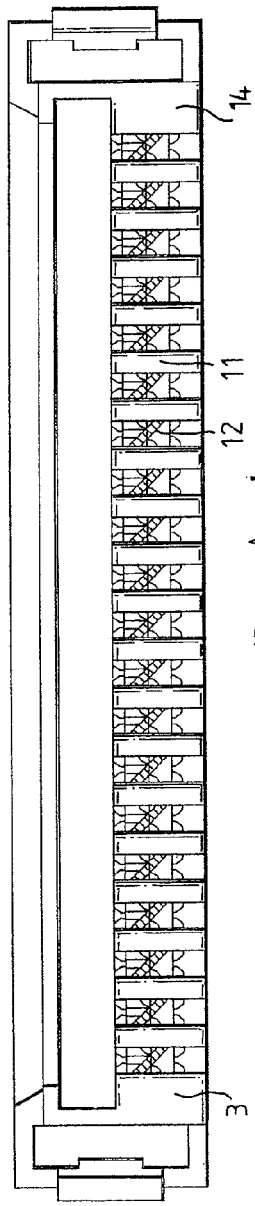
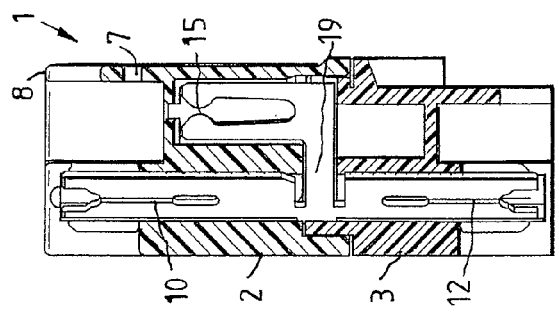
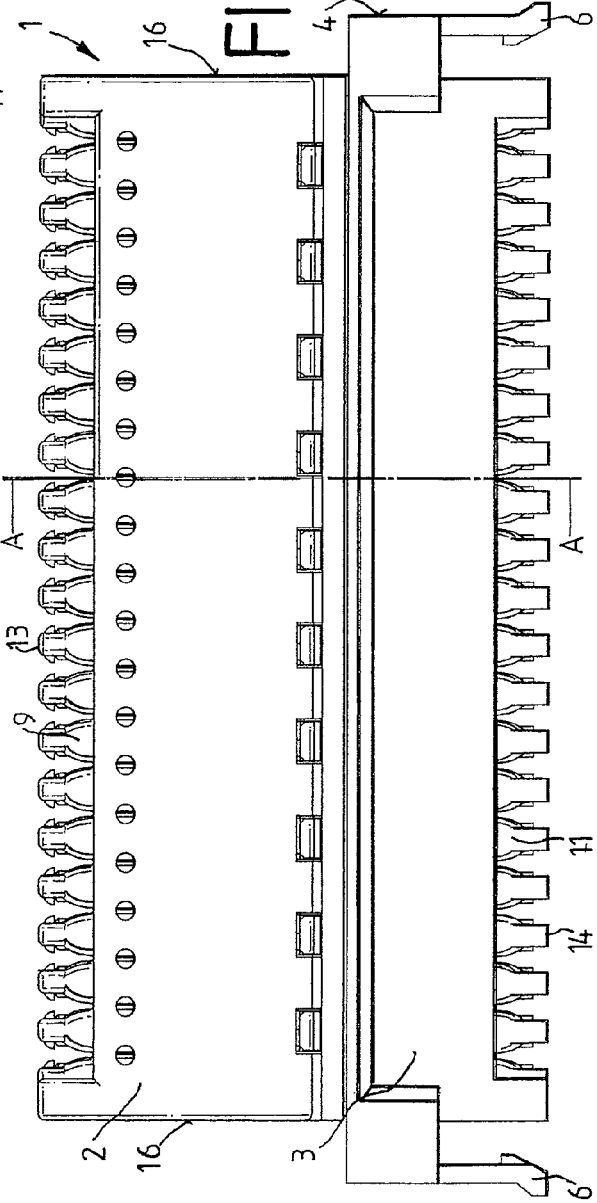
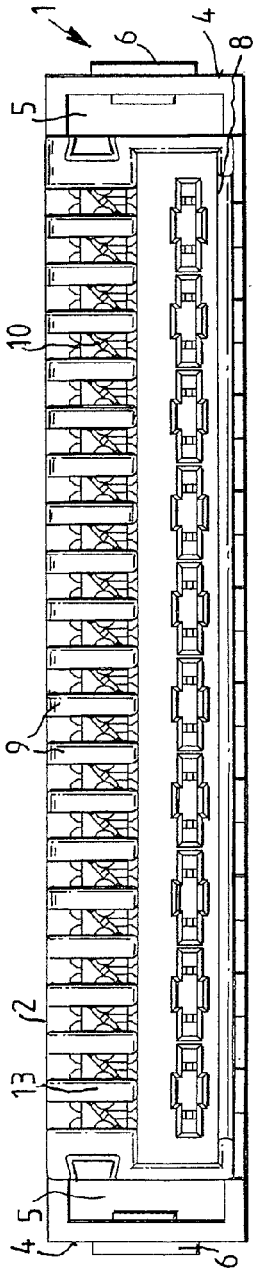
FIG.1
FIG.2
FIG.3
FIG.8 A-A

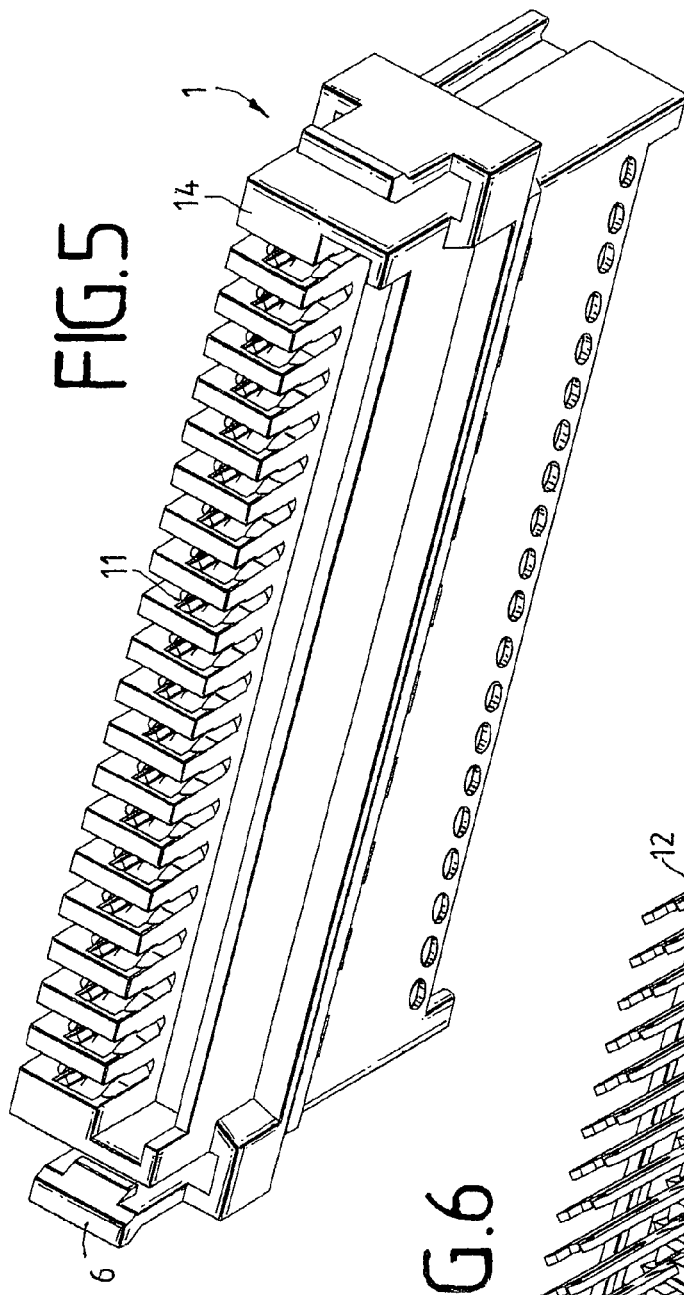
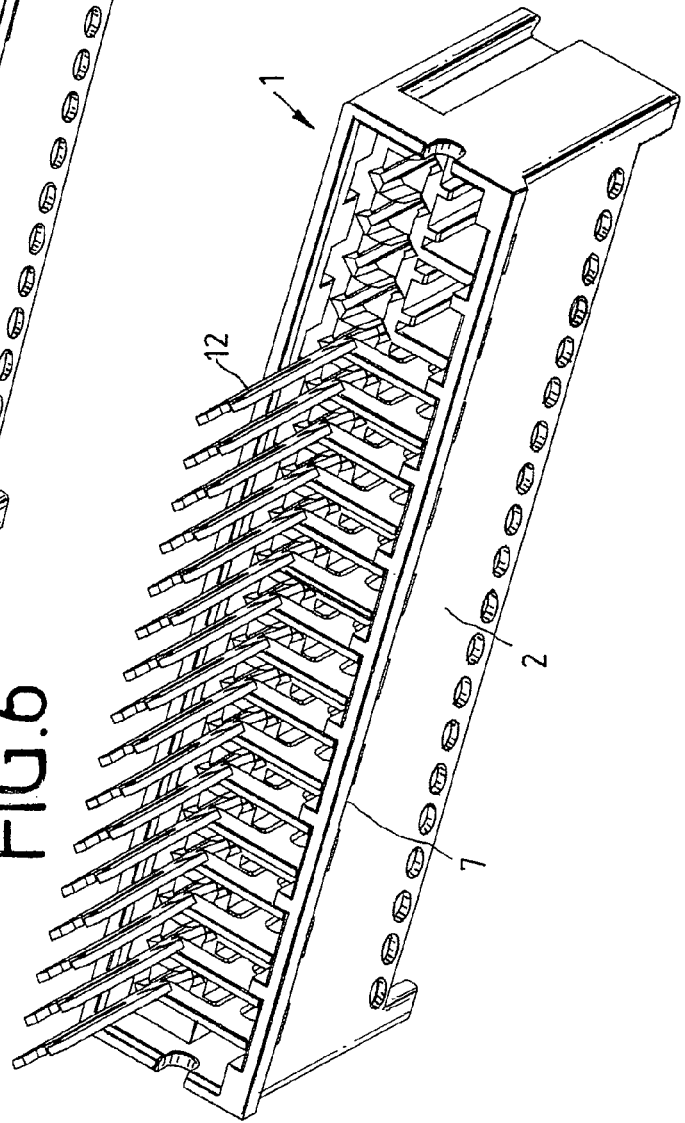
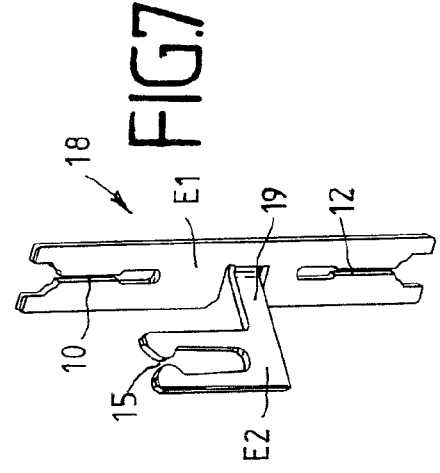

TERMINAL BLOCK AND CONTACT ELEMENT FOR TELECOMMUNICATIONS AND DATA SYSTEMS

This application is a National Stage Application of PCT/EP2008/003951, filed 16 May 2008, which claims benefit of Serial No. 10 2007 026 111.1, filed 5 Jun. 2007 in Germany and which applications are incorporated herein by reference. To the extent appropriate, a claim of priority is made to each of the above disclosed applications.

BACKGROUND

The invention relates to a connecting strip for telecommunications and data technology, and to an associated contact element.

A connecting strip of this generic type is known from EP 0 743 710 B1. The connecting strip has a multipart housing in which contacts for connection of conductors are arranged. The contacts are in this case arranged in the housing such that some of the contacts are accessible from the upper face and some of the contacts are accessible from the lower face. One contact which is accessible from the upper face and one contact which is accessible from the lower face in each case form a contact pair. The contacts are in this case designed such that, when mated, they form a double isolating contact, with one isolating contact being accessible from the upper face, and one isolating contact being accessible from the lower face. In the unconnected state of the isolating contacts, each contact on the upper face is then electrically connected to its associated contact from the lower face. Protective plugs, test plugs or isolating plugs can then be inserted into the isolating contacts. The known connecting strip has the disadvantage that its design is complicated, and its dimensions are large.

SUMMARY

The invention is therefore based on the technical problem of providing a connecting strip of this generic type, whose design is simple and which is compact, as well as providing an associated contact element.

For this purpose, the connecting strip for telecommunications and data technology has a housing in which first and second contacts for the connection of conductors are arranged, with the first contacts being accessible from the upper face of the housing and with the second contacts being accessible from the lower face of the housing, with a first and a second contact in each case forming a contact pair, with the contact pairs each having at least one externally accessible interface, via which plugs or magazines can be connected, in which case the interface is in the form of a fork contact, and the first contact, the second contact and the fork contact form an integral contact element. This makes it possible to shorten the distance from the first to the second contact, since there is no need to provide any long spring movements.

In one preferred embodiment, the first and the second contact lie on a common plane, which makes production of the contact element easier.

In a further preferred embodiment, the first and the second contact are in the form of insulation-displacement terminal contacts. However, other forms, such as wire-wrap, are also possible.

In a further preferred embodiment, the insulation-displacement terminal contacts are positioned at an angle of 45° (+/−)5° in the housing, so that they cut the conductors at an angle of 45°. The angle of 45° is in this case formed between the plane of the insulation-displacement terminal contacts and a side wall of the housing.

In a further preferred embodiment, the fork contact is accessible from the upper face of the housing, that is to say it is aligned in the direction of the first contact.

In a further preferred embodiment, the fork contact is positioned at an angle of 45° (+/−)5° to the first and second contacts, that is to say the plane of the fork contact is at right angles to the side surface of the housing.

In a further preferred embodiment, the housing has a stop edge on the upper face. This is used as rotation protection for a tool that can be placed on it, thus ensuring that the conductors are cut off during connection of the conductors from the correct side, so that no conductor residues can fall into the fork contact.

In a further preferred embodiment, the housing is formed in two parts.

BRIEF DESCRIPTION OF THE DRAWINGS

The invention will be explained in more detail in the following text with reference to one preferred exemplary embodiment. In the figures:

FIG. 1 shows a view of a connecting strip from underneath,

FIG. 2 shows a side view of the connecting strip,

FIG. 3 shows a plan view of the connecting strip,

FIG. 5 shows a perspective view of the connecting strip from underneath,

FIG. 6 shows a perspective view of the connecting strip, without the housing lower part, from underneath, FIG. 7 shows a perspective illustration of a contact element, and FIG. 8 shows a cross section through the connecting strip along the section line A-A in FIG. 2.

DETAILED DESCRIPTION

Figure 4:
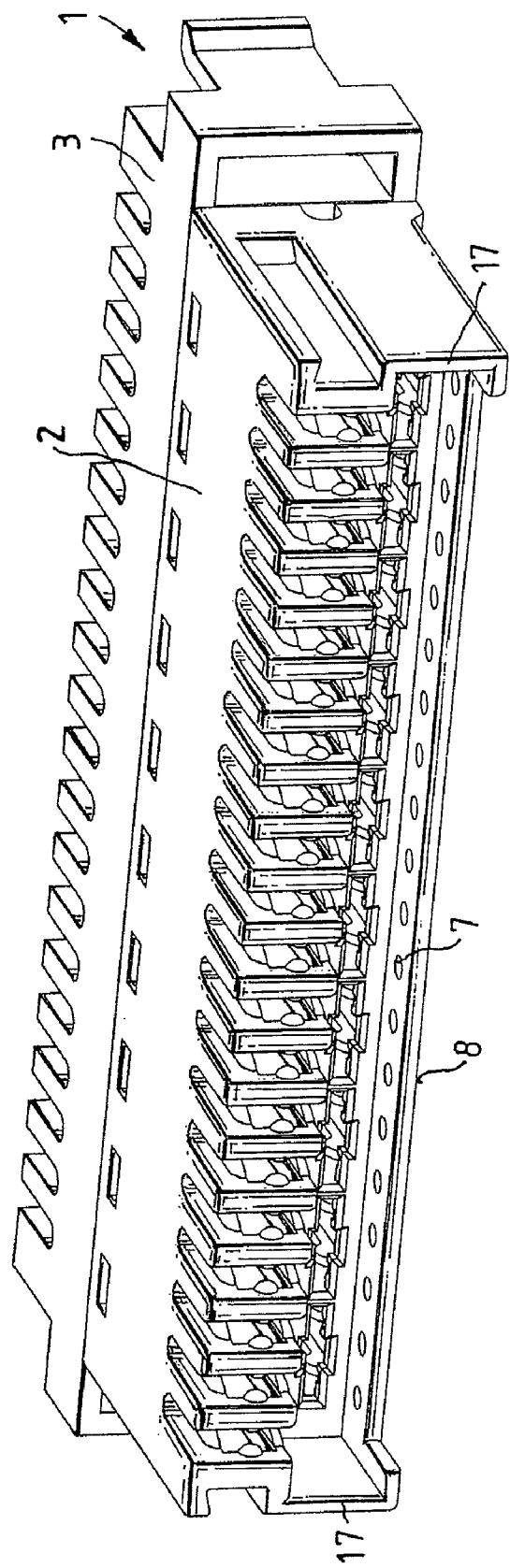
FIG. 4 shows a perspective plan view of the connecting strip.

The connecting strip 1 has a housing upper part 2 and a housing lower part 3, with a holder 5 with a latching lug 6 being arranged on the two end faces 4 of the housing lower part 3, via which holder 5 the connecting strip can be attached to a mounting system. One side surface 7 of the housing upper part 2 is raised and forms a stop edge 8, which acts as rotation protection for a tool which can be placed on it.

The housing upper part 2 has ribs 9 between which first contacts 10 in the form of insulation-displacement terminal contacts are arranged. In the same way, the housing lower part 3 has ribs 11 between which second contacts 12 in the form of insulation-displacement terminal contacts are arranged. In this case, the first contacts 10 are accessible from the upper face 13, and the second contacts 12 are accessible from the lower face 14. Two U-shaped supports 17 are arranged on the end faces 16 of the housing upper part 2 and are used to stabilize an overvoltage magazine, which is not illustrated but can be connected via fork contacts 15. As can be seen particularly clearly in FIG. 6, the second contacts 12 are positioned at an angle of 45° to the side surface 7, and this also applies to the first contacts 10. The housing lower part 3 has been removed in FIG. 6. Furthermore, four contact elements 18 have been removed, so that guides for the first contacts 10 as well as separating walls between the fork contacts 15 can be seen. The lower part 3 has corresponding guides for the second contacts 12. The second contacts 12 are all arranged parallel to one another, with all of the second contacts 12 being located in one row. In the same way, all of the first contacts 10 are located in one row, and all of the fork contacts 15.

A first contact 10, a second contact 12 and a fork contact 15 each form a contact element 18, which is formed integrally. In this case, the first contact 10 and the second contact 12 lie on a common plane E1. A web 19 originates preferably centrally from this plane E with the fork contact 15 being arranged at its end, as is illustrated in FIG. 7. The plane E2 of the fork contact 15 is in this case at an angle of 45° to the plane E1 of the first and second contacts 10, 12. Thus, in the inserted state, the plane E1 is at an angle of 45° to the side surfaces 7, and the plane E2 is at right angles to the side surfaces 7, as can be seen particularly well in FIG. 8. In this case, the housing lower part 3 supports the fork contact 15.

LIST OF REFERENCE SYMBOLS

1 Connecting strip
2 Housing upper part
3 Housing lower part
4 End faces
5 Holder
6 Latching lug
7 Side surface
8 Stop edge
9 Ribs
10 First contacts
11 Ribs
12 Second contacts
13 Upper face
14 Lower face
15 Fork contacts
16 End faces
17 U-shaped supports
18 Contact element
19 Web
E Plane
E1 Plane
E2 Plane

The invention claimed is:

1. Connecting strip for telecommunications and data technology, comprising:
a housing having an upper face and a lower face;
a plurality of contact elements arranged in the housing, each contact element having a first contact having a slot configured to receive a conductor, a second contact having a slot configured to receive another conductor, and an interface, the first contacts of the contact elements being accessible from the upper face of the housing and the second contacts of the contact elements being accessible from the lower face of the housing, the slot of each first contact being axially aligned with the slot of the respective second contact, the interface of each contact element being externally accessible, wherein the interface is a fork contact, and wherein each contact element is integrally formed.

2. The connecting strip according to claim 1, wherein the first contact and the second contact lie on a common plane.

3. The connecting strip according to claim 1, wherein the first and the second contact are in the form of insulation-displacement terminal contacts.

4. The connecting strip according to claim 3, wherein the insulation-displacement terminal contacts are positioned at an angle of 45° in the housing.

5. The connecting strip according to claim 1, wherein the fork contact is accessible from the upper face of the housing.

6. The connecting strip according to claim 1, wherein the fork contact is positioned at an angle of 45° to the first and second contacts.

7. The connecting strip according to claim 1, wherein the housing has a stop edge on the upper face.

8. The connecting strip according to claim 1, wherein the housing is formed in two parts.

9. A contact element for a connecting strip for telecommunications and data technology, comprising:
a first insulation-terminal contact having a first slot; and
a second insulation-terminal contact having a second slot that is aligned with the first slot, and
a fork contact,
wherein the contact element is formed integrally.

10. The contact element according to claim 9, wherein the first and second contacts are arranged rotated through 180° with respect to one another.

11. The contact element according to claim 10, wherein the first contact and the second contact lie on a common plane.

12. The contact element according to claim 9, wherein the first and the second contact are in the form of insulation-displacement terminal contacts.

13. The contact element according to claim 9, wherein the fork contact is arranged on a web.

14. The contact element according to claim 9, wherein the fork contact is aligned in the direction of the first contact.

15. The contact element according to claim 9, wherein the plane of the fork contact is positioned at an angle of 45° to the plane of the first and second contacts.

* * * * *